US008010446B2

(12) United States Patent
Talbert et al.

(10) Patent No.: US 8,010,446 B2
(45) Date of Patent: Aug. 30, 2011

(54) METHOD, SYSTEM AND APPARATUS FOR PROVIDING A VARIABLE CREDIT ACCOUNT TO A CONSUMER

(75) Inventors: Vincent W. Talbert, Cockeysville, MD (US); Thomas H. Keithley, Monkton, MD (US); Daniel A. Hirschfeld, Timonium, MD (US); Mark L. Lavelle, Govans, MD (US)

(73) Assignee: Bill Me Later Inc., Timonium, MD (US)

( * ) Notice: Subject to any disclaimer, the term of this patent is extended or adjusted under 35 U.S.C. 154(b) by 227 days.

(21) Appl. No.: 11/596,657

(22) PCT Filed: May 18, 2004

(86) PCT No.: PCT/US2004/015423
§ 371 (c)(1),
(2), (4) Date: Nov. 16, 2006

(87) PCT Pub. No.: WO2005/119543
PCT Pub. Date: Dec. 15, 2005

(65) Prior Publication Data
US 2008/0065530 A1    Mar. 13, 2008

(51) Int. Cl.
*G06Q 40/00* (2006.01)
(52) U.S. Cl. ............................................. 705/38; 705/35
(58) Field of Classification Search ........................ None
See application file for complete search history.

(56) References Cited

U.S. PATENT DOCUMENTS

| | | | | |
|---|---|---|---|---|
| 5,797,133 A | * | 8/1998 | Jones et al. | 705/38 |
| 5,866,889 A | * | 2/1999 | Weiss et al. | 235/379 |
| 6,324,524 B1 | * | 11/2001 | Lent et al. | 705/38 |
| 2001/0047330 A1 | * | 11/2001 | Gephart et al. | 705/39 |
| 2002/0147669 A1 | * | 10/2002 | Taylor et al. | 705/35 |
| 2002/0156720 A1 | * | 10/2002 | Chow et al. | 705/37 |

(Continued)

FOREIGN PATENT DOCUMENTS

| WO | WO 02/23439 A1 | 3/2002 |
|---|---|---|
| WO | WO0223439 | * 3/2002 |

OTHER PUBLICATIONS

The Federal Reserve Board today issued for public comment a proposal to amend its Regulation Z, Truth in Lending, to implement the Fair Credit and Charge Card Disclosure Act, American Banker Plus, Jan. 24, 1989, vol. 154, No. 16.*

(Continued)

*Primary Examiner* — James Kramer
*Assistant Examiner* — Carol See
(74) *Attorney, Agent, or Firm* — Haynes and Boone, LLP

(57) ABSTRACT

A method of providing a variable credit account to a consumer (12) is provided. The method includes the steps of: offering, by a credit issuer (14), a variable credit account to a consumer (12) by telephone, electronically, mail or at an in-store location; accepting, by the consumer (12), the offer; opening, by the credit issuer, the variable credit account (18) for the consumer (12), where the account includes an open-ended loan portion (22) and a close-ended loan portion (20). The method may further include the steps of initially activating the open-ended loan portion (22) when the initial offer is made electronically, by mail or at an in-store location; and initially activating a close-ended loan portion (20) of the account when the initial offer is made at any point-of-sale. A system and apparatus for providing a variable credit account to a consumer (12) is also discussed.

14 Claims, 3 Drawing Sheets

U.S. PATENT DOCUMENTS

2002/0169664 A1* 11/2002 Walker et al. .................. 705/14
2003/0078877 A1* 4/2003 Beirne et al. ................... 705/38
2003/0149656 A1* 8/2003 Magruder et al. ............. 705/38
2004/0230522 A1* 11/2004 Crosthwaite et al. .......... 705/38

OTHER PUBLICATIONS

Sinioukov, Tatyana, Financial services' e-commerce outreach, Sep. 2000, Dealerscope, v 42 n 9, pp. 28.*

* cited by examiner

METHOD, SYSTEM AND APPARATUS FOR PROVIDING A VARIABLE CREDIT ACCOUNT TO A CONSUMER

BACKGROUND OF THE INVENTION

1. Field of the Invention

The present invention relates generally to the provision of credit or loans to a consumer for engaging in credit-based transactions and, in particular, to a method, system and apparatus for providing a variable credit account to a consumer via a variety of communication methods, such as the telephone, electronically, by mail and at an in-store location.

2. Description of Related Art

In order to enable convenient purchases of goods and services by consumers, the financial service industry has developed many alternative payment methods that allow a consumer to engage in a transaction and receive goods and services on credit. For example, such alternative payment methods may include checks, ATM or debit cards, credit cards, charge cards, etc. In addition, these credit vehicles are able to be used on many platforms and via many communication methods and processes. For example, a credit or charge card may be used over the telephone, by mail order, electronically over the Internet or at an in-store location. The benefit of existing payment methods allow a consumer to move the point-of-sale (POS) from an in-store location to one's home. For example, a consumer may place an order from a catalog over the telephone and use a credit card or charge card to pay for the goods and/or services. A similar process can be used for mail orders.

Virtual commerce and the growth of the Internet as a medium for commerce have placed pressure on the payment options discussed above with respect to both convenience, transaction security and the profitability by the credit issuer. However, the consumer's convenience is paramount, and the Internet provides yet another POS, or option, to the consumer for purchasing goods and/or services via an alternative medium.

The consumer lending industry or credit issuer presently spends large amounts of money in hopes of successfully soliciting a consumer or customer to use a specific credit or loan vehicle, such as a credit card or charge card. Further, the consumer lending industry directly mails credit card offers to consumers at roughly fifty-cents per offer. Therefore, performing this marketing process through the mailbox can be costly. The consumer lending industry may also offer a credit card or charge card at an in-store location as the POS. While this is an available format, many consumers do not wish to engage in applying for a credit card at the in-store location, instead typically choosing to take the offer home and completing the application there. General utility credit cards have been offered on a limited basis at the in-store locations. While the industry has attempted to use this vehicle, the industry has suffered large monetary losses due to the inability to rate or index the consumer in a real-time basis. Therefore, the large quantity of offers for credit cards and similar credit accounts occurs through the mail.

Soliciting consumers to sign up for a credit card through the mail is not only costly, as discussed above, but the characteristics of the target or possible consumer is unknown ahead of time. This means that the vast majority of the mailed offers are never applied for or, in most circumstances, even read by the consumer. In part, this is due to the fact that just because one receives mail does not mean that he or she is the primary shopper or a target consumer in any case. Therefore, the consumer lending industry has just incurred a fifty-cent loss through untargeted marketing.

Credit accounts, otherwise known as loan programs, are regulated products by the United States government. Specifically, the government has various regulations directed to offers by credit issuers to the consumer over the telephone, by mail, over the Internet and at an in-store location. Therefore, the variance in regulation poses a specialized set of problems to the consumer lending industry. There are normally two categories of loans, namely, an open-ended loan vehicle, such as a credit card, and a close-ended loan vehicle, such as a typical non-rechargeable loan, e.g., a car loan.

According to the regulations, an open-ended loan, such as a credit card offer, cannot be conducted over the telephone. This appears to be the case since the consumer must fully understand the terms, conditions and services offered by the credit issuer prior to engagement, which is not easily transmittable or conductible over the telephone. Specifically, such credit card offers are typically in writing, thus allowing the consumer to read, fully understand and agree to the terms and conditions of the credit card or credit issuer. Therefore, the credit issuer cannot offer a credit card to a consumer over the telephone, thus placing the consumer lending industry back in the same position as before, wherein the marketing exists via a writing, such as by mail, over the Internet or at an in-store location.

SUMMARY OF THE INVENTION

It is, therefore, an object of the present invention to provide a method, system and apparatus for providing a variable credit account to a consumer that overcome the deficiencies of the prior art. It is another object of the present invention to provide a method, system and apparatus for providing a variable credit account to a consumer that is a multi-part account. It is a further object of the present invention to provide a method, system and apparatus for providing a variable credit account to a consumer that may be marketed over any and all of the telephone, the Internet, by mail and at an in-store location. It is a still further object of the present invention to provide a method, system and apparatus for providing a variable credit account to a consumer that allows a subsequent initiation of one or more parts of the multi-part account during subsequent transactions between the merchant and consumer.

The present invention is directed to a method for providing a variable credit account to a consumer. This method includes the steps of: (a) offering, by a credit issuer, a variable credit account to a consumer by at least one of the telephone, electronically, by mail and at an in-store location; (b) accepting, by the consumer, the credit issuer offer; and (c) opening, by the credit issuer, the variable credit account for the consumer, wherein the variable credit account includes an open-ended loan portion and a close-ended loan portion. In a preferred and non-limiting embodiment, the method further includes the steps of: initially activating the open-ended loan portion of the variable credit account when the initial offer by the credit issuer is made at least one of electronically, by mail, and at the in-store location; and initially activating the close-ended loan portion of the variable credit account when the initial offer by the credit issuer is made by at least one of the telephone, electronically, by mail and at an in-store location. In addition, in a preferred and non-limiting embodiment, the method also includes the step of subsequently activating the non-initially-activated or unopened loan portion of the variable credit account at a subsequent transaction between a merchant and a consumer.

The present invention is also directed to an apparatus for providing a variable credit account to a consumer. The apparatus includes means for offering, by a credit issuer, a variable credit account to a consumer by at least one of the telephone, electronically, by mail and at an in-store location; means for accepting, by the consumer, the credit issuer offer; and means for opening, by the credit issuer, the variable credit account for the consumer, wherein the variable credit account includes an open-ended loan portion and a close-ended loan portion. In one embodiment, the apparatus further includes means for initially activating the open-ended loan portion of the variable credit account when the initial offer by the credit issuer is made at least one of electronically, by mail, and at the in-store location; and means for initially activating the close-ended loan portion of the variable credit account when the initial offer by the credit issuer is made by at least one of the telephone, electronically, by mail and at an in-store location.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 3:
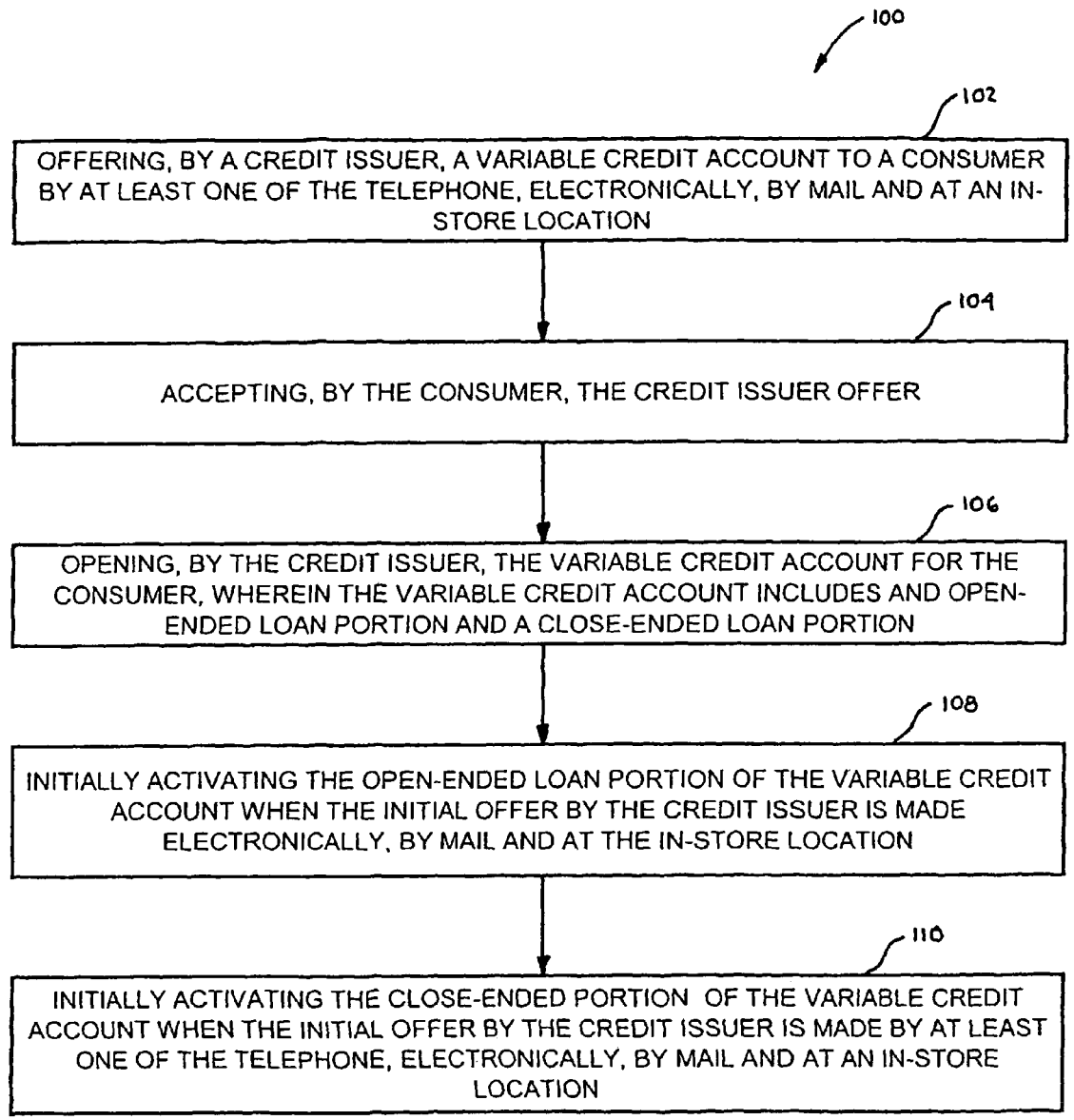
FIG. 3 is a flow diagram of a method for providing a variable credit account to a consumer according to the present invention.
Figure 4:
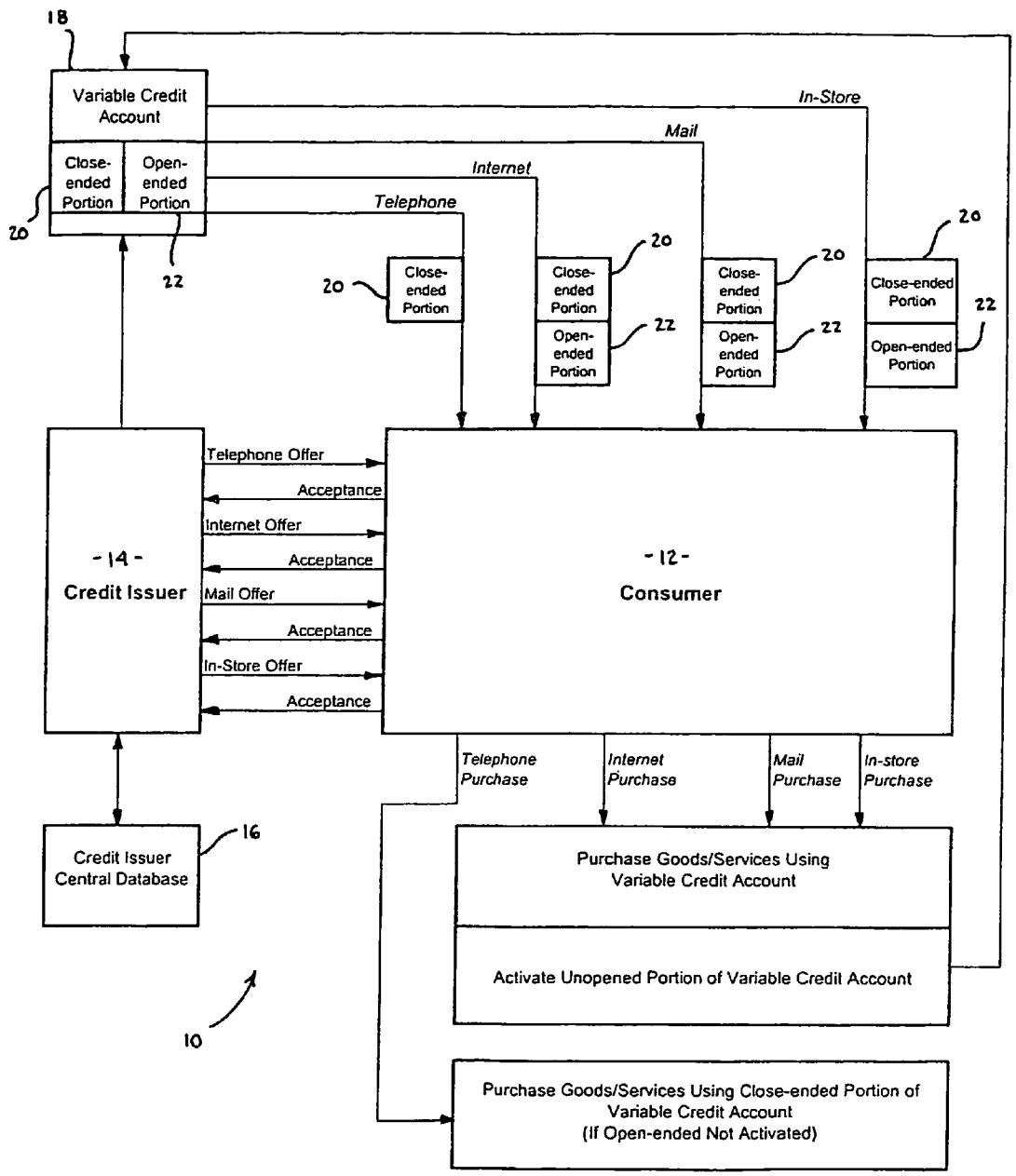
FIG. 4 is a schematic view of the method and system of FIG. 3.

The present invention is directed to a method, system and apparatus for providing a variable credit account to a consumer. The method of the present invention and a schematic view of the system implementing this method are illustrated in FIGS. 3 and 4. The present invention is also directed to an apparatus for providing a variable credit account to a consumer. It is envisioned that such an apparatus implements one or more portions of the preferred embodiments of the method and system of the present invention in a computer-implemented format. For example, one or more of the steps of the method of the present invention, as discussed hereinafter, may be automatically performed by a computing device, such as a personal computer, a networked device, a laptop, a palmtop, a personal digital assistance and a server. Therefore, various portions of the presently-invented method and system may be enhanced by, augmented by or otherwise conducted over a computer or networked system.

Figure 1:
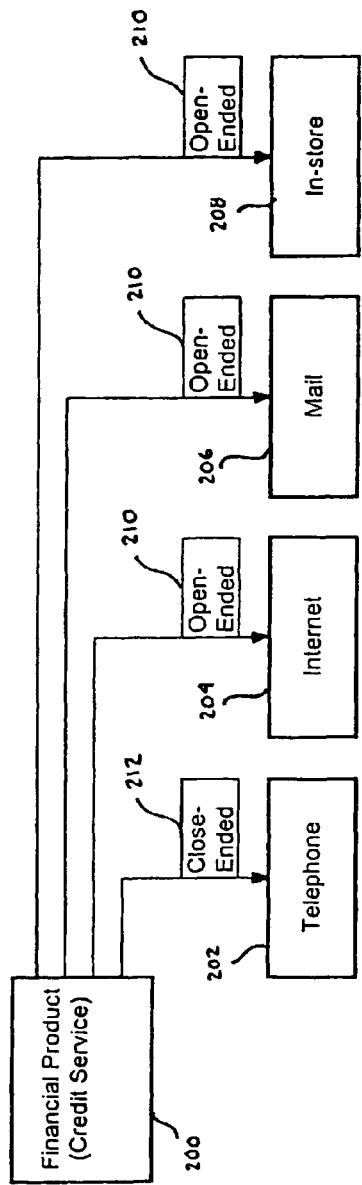
FIG. 1 is a schematic view of a financial product or loan offering according to the prior art.

As seen in FIG. 1, a credit issuer may offer a financial product 200, typically referred to as a credit service or loan, to a consumer via various media and method of communication. Specifically, the financial product 200 may be offered via telephone 202, the Internet 204 (electronically), by mail 206 or at an in-store location 208. While the Internet 204 has been specifically referred to above, it is envisioned that any electronically-based offer of the financial product 200 is envisioned as is known in the art.

Due to present regulations, an open-ended credit vehicle 210 may only be offered over those media that allow a consumer to fully understand the terms, conditions and services offered by the credit issuer. Typically, the terms and conditions of a credit card offer are lengthy and require thorough review prior to the consumer accepting the offer. Therefore, according to the present regulations, such an open-ended credit vehicle 210 is only feasibly offerable over the Internet 204, by mail 206 or at an in-store location 208. This is typically the case, since these three media allow the consumer to thoroughly review, in writing, the terms and conditions of the financial product 200.

The telephone 202, while providing a convenient media for marketing, includes particular drawbacks to the consumer lending industry. According to the regulations, only a close-ended credit vehicle 212 can be feasibly offered over the telephone 202. This occurs since it is particularly costly in attempting to explain many pages of terms and conditions orally to a target consumer over the telephone 202. Still further, and more importantly, the consumer would never sit on the telephone 202 and listen to page after page of terms and conditions relating to the financial product 200. Accordingly, only close-ended credit vehicles 212 can be offered, which entails financial products 200 that are non-rechargeable. As an example, close-ended credit vehicles 212 include car loans, house loans, etc.

Figure 2:
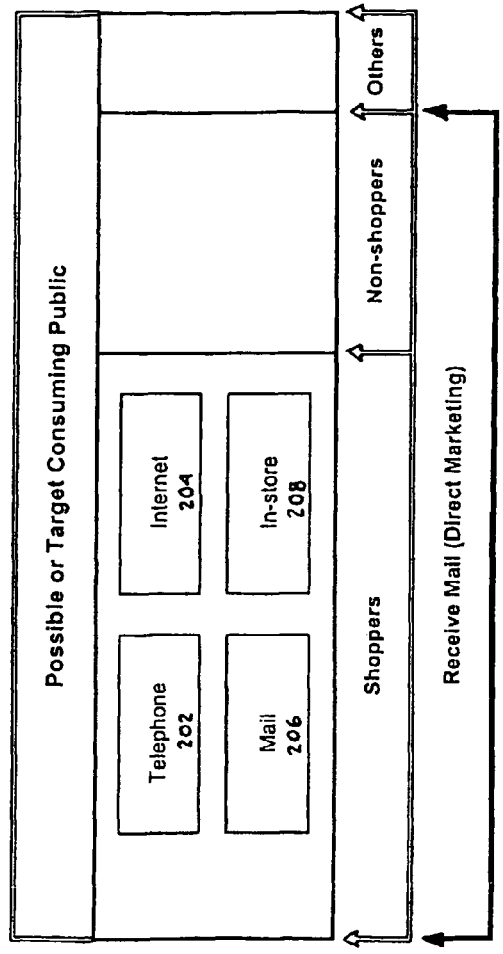
FIG. 2 is a schematic diagram of the possible or target consuming public according to the prior art.

According to FIG. 2, the possible or "target" consuming public includes three general categories, namely, shoppers, non-shoppers and others. The shoppers conduct credit transactions over the telephone 202, the Internet 204, the mail 206 and at in-store locations 208. Further, it is the shoppers that the credit issuers would prefer to specifically target. However, as discussed in detail above, since open-ended credit vehicles 210 cannot be target marketed over the telephone, such offers are typically conducted by mail. Mail offers are expensive and, as seen in FIG. 2, also target non-shoppers, resulting in a financial loss to the credit issuer.

Therefore, two major drawbacks are seen in the prior art. First, by mailing financial product 200 offers through the mail to anyone that receives mail, the credit issuer is losing considerable money by incurring costs in an attempt to convince consumers to use a specific credit card or charge card. However, since non-shoppers are also receiving these offers, the consumer lending industry financial investment does not have a reasonable chance of success with respect to the non-shoppers. Another drawback is that only a close-ended credit vehicle 212 is able to be offered over the telephone 202, and this close-ended credit vehicle 212 cannot be subsequently recharged, which yields a particularly non-useful account to the consumer. Consumers or shoppers would like to use a credit card over the telephone 202, as well as the Internet 204, by mail 206 and at the in-store location 208, regardless of how the offer was made to them.

According to the present invention, a method 100 is included for providing a variable credit account to a consumer. According to this method 100, and in one preferred and non-limiting embodiment, the method 100 includes the steps of: offering, by a credit issuer, a variable credit account to a consumer by at least one of the telephone, electronically, by mail and at an in-store location (Step 102); accepting, by the consumer, the credit issuer offer (Step 104); and opening, by the credit issuer, a variable credit account for the consumer, wherein the variable credit account includes an open-ended loan portion and a close-ended loan portion (Step 106). In a preferred and non-limiting embodiment, as illustrated in FIG. 3, the method further includes the steps of: initially activating the open-ended loan portion of the variable credit account when the initial offer by the credit issuer is made electronically, by mail and at the in-store location (Step 108); and initially activating the close-ended portion of the variable credit account when the initial offer by the credit issuer is made by at least one of the telephone, electronically, by mail and at the in-store location (Step 110). In a still further preferred embodiment, the method 100 includes the step of subsequently activating the non-initially-activated loan portion of the variable credit account at a subsequent transaction or communication between a merchant and the consumer.

The present invention is also directed to a system 10 for providing a variable credit account to a consumer 12 as illustrated in FIG. 4. A credit issuer 14 engages in an offer of credit services, including a variable credit account 18, to the consumer 12, and this offer can be a telephone offer, an Internet offer, a mail offer and/or an in-store offer. If the consumer 12 accepts the offer of the credit issuer 14, whether in the form of a return application or some other written or verbal action that indicates acceptance, the credit issuer 14 typically makes a final decision regarding the consumer 12. For example, the credit issuer 14 may transmit certain information or data to a credit issuer central database 16, and the credit issuer central database 16 is used as a data feed into some other process that enables the credit issuer 14 to assess the consumer 12 creditworthiness, profitability, fraud-risk, other risk factors, etc.

In order to assist the credit issuer 14 in making an informed decision regarding the consumer 12, the credit issuer central database 16 may include specified data and otherwise act a data warehouse. For example, the credit issuer central database 16 (or some third-party database) may include a data set having multiple fields populated with data reflecting consumer's name, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, customer type, a company identity, a merchant identity, a third-party risk score, a general credit risk score, a credit bureau risk score, a prior approval, prior report data, previous transaction data, a geographical risk factor, credit account data, bankcard balance data, delinquency data, credit segment data, time between transactions data, previous transaction amount, previous transaction approval status, previous transaction time stamp data, a response code, active trades in database, public record data, trade line data, transaction medium, credit segment data, consumer payment type, consumer payment method, consumer payment history, consumer account history, consumer credit account balance and merchant history. A portion or all of this data may be used in assessing the consumer 12 with respect to initiating an offer, activating the variable credit account 18, etc.

In one preferred and non-limiting embodiment, the credit issuer 14 will assess the consumer 12 prior to either the initial offer of the variable credit account 18, the consumer's 12 acceptance and/or the subsequent opening or activation of the variable credit account 18 by the credit issuer 14. As discussed above, the assessment may include: (i) transmission of data to the credit issuer central database 16; (ii) transmission of data to some third-party database (such as a credit agency or the like); (iii) processing data related to the consumer 12; (iv) rating the consumer 12; and (v) verifying the authenticity of the consumer 12. Based upon this assessment, the credit issuer 14 may approve the consumer 12, reject the consumer 12, decide against offering the variable credit account 18 to the consumer, etc.

Once the credit issuer 14 decides to engage in and initiate the contract with the consumer 12, the credit issuer 14 creates the variable credit account 18 having a close-ended portion 20 and an open-ended portion 22. If the offer by the credit issuer 14 and the acceptance by the consumer 12 took place over the telephone, only the close-ended portion 20 of the variable credit account 18 may be activated for the consumer 12. However, if the initial offer and acceptance took place over the Internet, via the mail or at an in-store location, the full variable credit account 18 may be activated, namely, both the close-ended portion 20 and the open-ended portion 22 are activated, thus providing the consumer 12 with a fully functional variable credit account 18. Alternatively, it may be preferable to activate only the open-ended portion 22 of the variable credit account 18.

If it is logistically difficult or does not make financial sense to open both the close-ended portion 20 and the open-ended portion 22 of the variable credit account 18 initially, the unopened portion 20, 22 of the variable credit account 18 can be opened at a later date. As seen in FIG. 4, if the consumer 12 engages in an Internet purchase, a mail purchase or an in-store purchase, the consumer 12 is allowed to consume goods and/or services using the variable credit account 18 provided. Further, at this point, it may be desirable to open either the unopened close-ended portion 20 or the unopened open-ended portion 22 of the variable credit account 18, thereby providing the consumer 12 with a fully active variable credit account 18.

For example, if the original offer and acceptance were engaged in over the telephone, only the close-ended portion 20 of the variable credit account 18 would be active when the consumer 12 subsequently engages in an Internet, mail or in-store purchase. However, since the consumer 12 is now engaging in such a purchase, he or she can be provided with the appropriate terms and conditions and the open-ended portion 22 of the variable credit account 18 can be properly activated according to the regulations. However, it is envisioned that the activation of the unopened portion 20, 22 of the variable credit account 18 may also occur during the any subsequent communication between the credit issuer 14 and the consumer 12.

In one preferred and non-limiting embodiment, an account statement (such as in the form of a bill) is transmitted to the consumer 12, and this account statement includes specified terms and conditions relating to the variable credit account 18 for review by the consumer 12. At this point, the consumer 12 will somehow acknowledge that the specified terms and conditions are acceptable and transmit this acknowledgement to the credit issuer 14. Once the credit issuer 14 receives this acknowledgement, the credit issuer 14 may activate the inactivated portion of the variable credit account 18, whether the close-ended portion 20 and/or the open-ended portion 22 of the variable credit account 18. The consumer 12 acknowledgement may be in written form, verbal form, application format or some other indication of acknowledgement. For example, the consumer 12 may simply check a box indicating that he or she has read and understood the terms and conditions and wishes to activate the open-ended portion 22 or rechargeable portion of the variable credit account 18.

If the original offer and acceptance occurred over the telephone and only the close-ended portion 20 of the variable credit account 18 is active, and further if the consumer 12 engages in only a telephone purchase, this purchase of goods and/or services would be conducted using a close-ended portion 20 of the variable credit account 18. Further, the credit issuer 14 could not activate the open-ended portion 22 of the variable credit account 18 since the consumer 12 has still not read or been fully apprised of the terms and conditions of the variable credit account 18. However, it should be noted that since the close-ended portion 20 of the variable credit account 18 is activated as a non-rechargeable account, it is unlikely that any further purchases could be made over the telephone on the close-ended portion 20 of the variable credit account 18. Accordingly, such a scenario is unlikely to occur.

The typical scenario is that the open-ended portion 22 of the variable credit account 18 is activated when used at an appropriate point-of-sale, such as over the Internet, by mail or at an in-store location. However, as discussed above, the open-ended portion 22 may be activated upon any acceptable and compliant indication by the consumer 12 to the credit issuer 14. The present invention is also directed to an apparatus enabling the above-discussed system 10. For example, any one or more parts or steps of the method 100 and system 10 can be computerized and conducted in a networked or otherwise automated environment. Any suitable apparatus and automated environment is envisioned.

In this manner, the present method 100, system 10 and apparatus targets only the shoppers and true consumers at the point-of-sale, whether by telephone, Internet, mail or at an in-store location. Therefore, expensive and unwieldy direct marketing by mail is not required. The variable credit account 18 of the present invention can be offered over the telephone, which drastically reduces the cost of acquisition of the consumer 12. Since the variable account 18 is a multi-part account, only the portion 20, 22 that may be compliantly activated at a particular point-of-sale is so activated. Further, the present method 100, system 10 and apparatus allows for the migration or subsequent activation of any of the unopened portions 20, 22 of the variable credit account 18 during a subsequent purchase, billing or other compliant communication with the consumer 12.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A method of providing a variable credit account to a consumer, the method comprising:
   (a) offering, by a credit issuer, a variable credit account having an open-ended loan portion and a close-ended loan portion to the consumer via a telephone call, wherein the close-ended loan portion is not rechargeable and the open-ended loan portion is rechargeable;
   (b) receiving an acceptance, from the consumer, of the credit issuer offer of the variable credit account during the telephone call;
   (c) opening, by the credit issuer, the variable credit account for the consumer based on the receiving of the acceptance from the consumer;
   (d) activating, by the credit issuer via a computer during the telephone call, the close-ended loan portion of the variable credit account, allowing the consumer to purchase goods and/or services using an available balance of the close-ended loan portion subsequent to the activating of the close-ended loan portion and prior to activating and allowing the consumer to purchase goods and/or services using the open-ended loan portion;
   (e) communicating by the credit issuer with the consumer, the communication in electronic written form or paper mail written form providing specified terms and conditions relating to the open-ended loan portion of the variable credit account for review by the consumer;
   (f) receiving an acknowledgement, from the consumer, that the specified terms and conditions are acceptable; and
   (g) activating, by the computer for the credit issuer, the open-ended loan portion of the variable credit account, subsequent to the receiving of the acknowledgement from the consumer, allowing the consumer to purchase goods and/or services using an available balance of the open-ended loan portion.

2. The method of claim 1, wherein the communication is in the form of an account statement transmitted to the consumer, the account statement including the specified terms and conditions relating to the open-ended loan portion of the variable credit account for review by the consumer.

3. The method of claim 2,
   wherein the activating the open-ended loan portion of the variable credit account includes providing a charge card for the consumer to access credit of the open-ended loan portion.

4. The method of claim 3, wherein the acknowledgement from the consumer is in at least one of the following: written form, verbal form, transmission of an application, an indication of acknowledgement, and a selection indication.

5. The method of claim 1, further comprising assessing, by the credit issuer, the consumer.

6. The method of claim 5, wherein the assessing step further includes at least one of the following:
   (i) transmitting data regarding the consumer to a credit issuer central database;
   (ii) transmitting the data to a third-party database;
   (iii) processing the data relating to the consumer;
   (iv) rating the consumer; and
   (v) verifying the authenticity of the consumer.

7. The method of claim 6, wherein the consumer is rated for at least one of the following: credit risk, fraud risk, profitability, and risk factors.

8. The method of claim 6, wherein at least one of the central credit issuer database and the third-party database includes a data set including at least one field populated with data reflecting at least one of the following: a consumer's name, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, customer type, a company identity, a merchant identity, a third-party risk score, a general credit risk score, a credit bureau risk score, a prior approval, prior report data, previous transaction data, a geographical risk factor, credit account data, bankcard balance data, delinquency data, credit segment data, time between transactions data, previous transaction amount, previous transaction approval status, previous transaction time stamp data, a response code, active trades in database, public record data, trade line data, transaction medium, credit segment data, consumer payment type, consumer payment method, consumer payment history, consumer account history, consumer credit account balance, and merchant history.

9. The method of claim 5, further comprising approving the consumer by the credit issuer based upon the assessing of the consumer by the credit issuer.

10. The method of claim 1, wherein at least one of steps (a)-(c) is automatically performed by a computing device.

11. The method of claim 10, wherein the computing device is at least one of the following: a personal computer, a networked device, a laptop, a palmtop, a personal digital assistant, and a server.

12. An apparatus for providing a variable credit account to a consumer, the apparatus comprising:

a telephone configured for use, by a credit issuer, to offer a variable credit account having an open-ended loan portion and a close-ended loan portion to the consumer via a telephone call, wherein the close-ended loan portion is not rechargeable and the open-ended loan portion is rechargeable;

a computer configured for use, by the credit issuer, to open the variable credit account for the consumer based on an accepting by the consumer of the variable credit account during the telephone call;

wherein the computer is configured for use, by the credit issuer during the telephone call, to activate the close-ended loan portion of the variable credit account, allowing the consumer to purchase goods and/or services using an available balance of the close-ended loan portion subsequent to the activating of the close-ended loan portion and prior to activating and allowing the consumer to purchase goods and/or services using the open-ended loan portion;

wherein the computer is configured for use, by the credit issuer, to communicate with the consumer, the communication in electronic form or paper mail form to provide specified terms and conditions relating to the open-ended loan portion of the variable credit account for review and acceptance by the consumer; and wherein the computer is configured for use, by the credit issuer, to activate the open-ended loan portion of the variable credit account, subsequent to the acceptance by the consumer, allowing the consumer to purchase goods and/or services using an available balance of the open-ended loan portion.

13. The apparatus of claim 12, wherein the communication is in the form of an account statement transmitted to the consumer, the account statement including the specified terms and conditions relating to the open-ended loan portion of the variable credit account for review by the consumer.

14. The apparatus of claim 13, wherein the communication further includes providing a charge card for the consumer to access credit of the open-ended loan portion upon acceptance by the consumer of the terms and conditions.

\* \* \* \* \*